Figure 1:
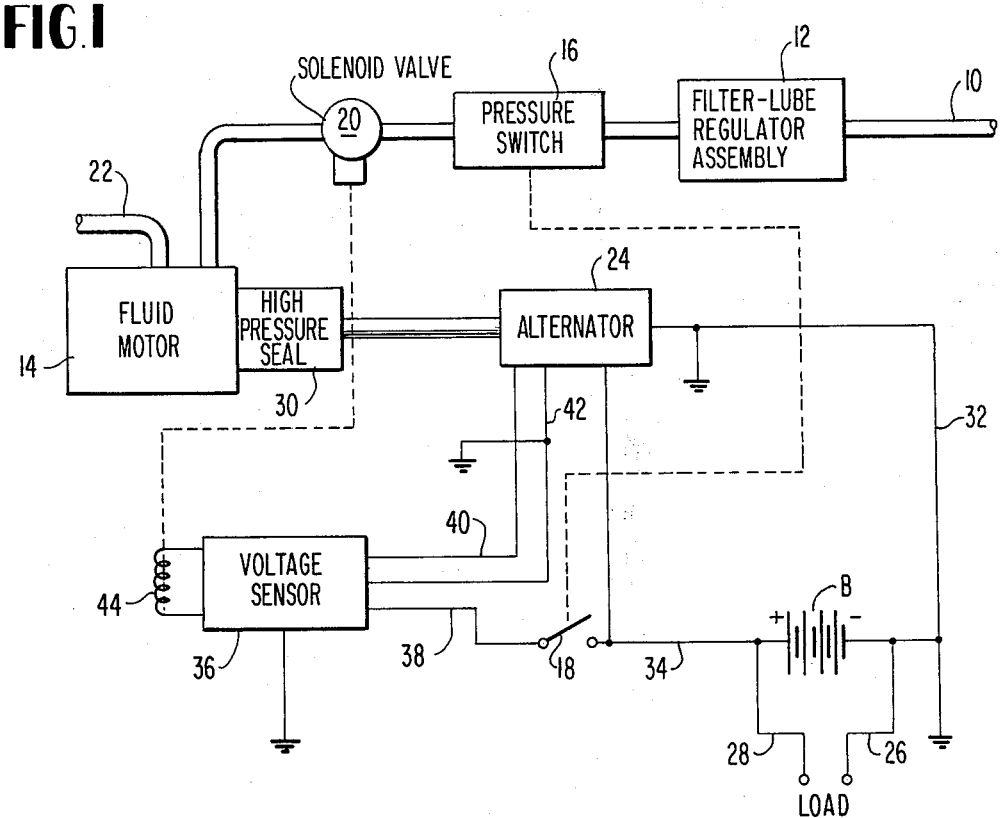

United States Patent
Milano

[11] 3,921,052
[45] Nov. 18, 1975

[54] FLUID AUTOCHARGING SYSTEM
[75] Inventor: Blaise L. Milano, River Ridge, La.
[73] Assignee: Gen-Star, Inc., La.
[22] Filed: Sept. 23, 1974
[21] Appl. No.: 508,539

[52] U.S. Cl. ..................... 320/61; 290/50; 322/35; 317/18 C
[51] Int. Cl.² .......................................... H02J 7/14
[58] Field of Search ........ 320/61, 2, 29, 62; 290/50, 290/52, 54; 322/35; 317/18 C

[56] References Cited
UNITED STATES PATENTS

| | | | |
|---|---|---|---|
| 3,507,580 | 4/1970 | Howard et al. | 320/61 UX |
| 3,641,416 | 2/1972 | Riff | 320/61 |

*Primary Examiner*—J. D. Miller
*Assistant Examiner*—Robert J. Hickey
*Attorney, Agent, or Firm*—LeBlanc & Shur

[57] ABSTRACT

Disclosed is a system for charging a battery at locations where fluid under pressure is readily available. The fluid under pressure flows through an intake line containing a filter, lubricator, regulator assembly, a pressure switch and a valve to a fluid actuated motor which drives an alternator electrically coupled to a battery. A sensing unit is electrically coupled to the alternator, valve and battery. When the battery requires charging, the sensing unit senses the voltage and electrically opens the valve and energizes the alternator field simultaneously, whereby fluid under pressure drives the fluid motor and the alternator to recharge the battery. When the battery is fully charged the sensing unit electrically closes the valve and opens the field circuit on alternator, thereby cutting off the supply of fluid under pressure to the fluid motor which, in turn shuts down the alternator. In the event that the fluid under pressure is cut off, the pressure switch opens to electrically disconnect the alternator, solenoid valve and sensing unit to preclude power drain thereto from the battery and allows the battery charge to be used only for the load circuit.

8 Claims, 2 Drawing Figures

U.S. Patent Nov. 18, 1975 3,921,052

FLUID AUTOCHARGING SYSTEM

The present invention relates to power generating systems and particularly relates to a power generating system for recharging batteries utilizing available pressurized fluid, i.e., air or gas under pressure, as a prime motive source.

Many systems requiring electrical power utilize nonrechargeable batteries of the dry cell type as a source for that power. There are, however, obvious disadvantages in utilizing batteries of this type as the prime source of electrical power including their lack of durability and longevity. For example, isolated land well locations and offshore well platforms often depend primarily upon battery operated D.C. current systems to operate emergency lighting systems, local communication systems and/or navaids and other limited power needs. Dry cell batteries are utilized to power such systems. It has been found, however, that such batteries operate satisfactorily only for a limited duration, i.e., up to approximately six months, depending upon the extent of their usage. Obviously, the cost of periodically replacing these batteries is considerable.

It has therefore been found desirable, particularly in those applications or environments wherein there is a readily available source of fluid, i.e. gas or air under pressure and it is a principal object of the present invention to provide a system for recharging such batteries from available fluid under pressure whereby the durability and longevity of the batteries is greatly extended. To these and other ends, the present invention provides a power generating system of the type for recharging a battery utilizing fluid under pressure as the prime motive source for generating electrical current and hence for recharging such battery. The present invention therefore provides a fluid intake line in which fluid under pressure flows through a valve, lubricator-filter-regulator assembly to a fluid motor. The drive shaft of the motor is coupled mechanically through a high pressure seal to an alternator which, in turn, is electrically coupled to the battery which is to be recharged. A sensing unit is electrically coupled through a pressure actuated switch to the alternator and operates a solenoid which controls the valve in the fluid line. Also, a pressure actuated switch is disposed in the fluid line upstream of the solenoid valve, the switch thereof being electrically connected between the battery on the one hand and the alternator, solenoid valve, and sensing unit on the other hand.

To operate the system, fluid under pressure in the intake line actuates the pressure switch to close the electrical connection between the battery on the one hand and the alternator solenoid valve and sensing unit on the other hand. The fluid under pressure may comprise natural gas taken from available supplies for example, at a well site and which gas also flows through a regulator in the intake line to provide the motor with fluid at a regulated pressure. Accordingly, the fluid flows through the valve to drive the motor whereupon the fluid is exhauted. The motor in turn mechanically drives the alternator which generates electricity which is then supplied to the battery to recharge the same. When the battery is completely charged, a predetermined voltage on the battery is obtained. This predetermined voltage is sensed by the sensing unit which then, in turn, closes the solenoid valve in the fluid intake line. By shutting down the fluid intake line, the motor and the alternator thereby stop. As the battery is utilized and its charge depleted, a predetermined lower voltage is obtained which is sensed by the sensing unit. Upon sensing this lower voltage, the sensing unit operates through the solenoid to open the valve in the fluid intake line. Fluid under pressure is then again supplied to the motor to drive the alternator whereby the battery is charged, this recharging and cutoff cycle being accomplished periodically whenever the battery obtains the predetermined low and high voltages respectively.

In the event that the fluid under pressure is depleted or does not obtain the desired pressure, the pressure switch remains open and electrically disconnects the battery on the one hand and the alternator, solenoid valve and sensing unit on the other hand. This prevents the alternator, solenoid valve and sensing unit from draining the charged battery and enables the charge on the battery to be used only for the load circuit.

Accordingly, it is a primary object of the present invention to provide a novel and improved power generating system for recharging batteries.

It is another object of the present invention to provide a novel and improved power generating system for recharging batteries which utilizes available fluid i.e., gas, air or other fluids under pressure as the prime source of power for such power generation.

It is another object of the present invention to provide a novel and improved power generating system for recharging batteries in a hazardous atmosphere as is found on gas and oil production platforms.

It is another object of the present invention to provide a novel and improved power generating system for recharging batteries having the foregoing characteristics and wherein the system automatically prevents power drain-off from the battery except for the load, in the event of a depletion or shutdown of fluid under pressure available to the system.

It is a further object of the present invention to provide a novel and improved power generating system for recharging batteries utilizing available fluid under pressure for driving a fluid motor to drive an alternator for recharging the battery, the system providing for periodic actuation of the fluid motor and alternator in response to the battery's needs for recharging.

Figure 2:
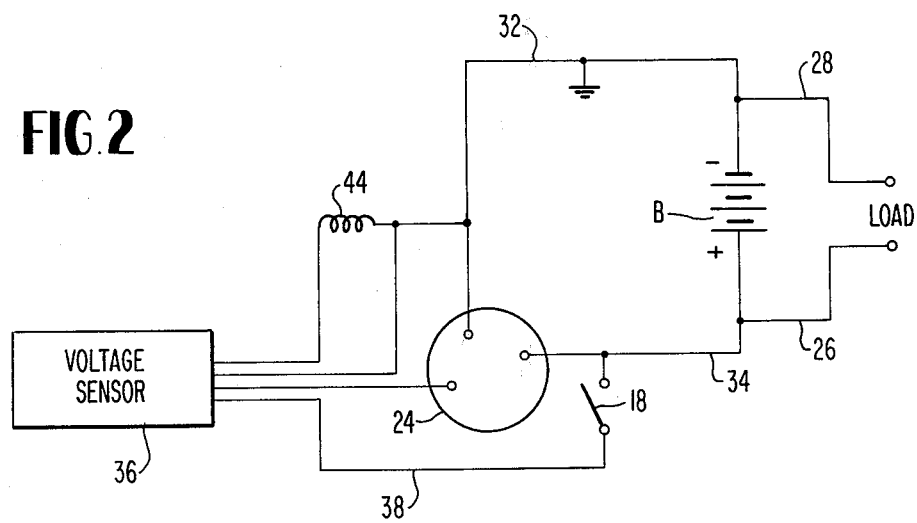

These and further objects and advantages of the present invention will become more apparent upon reference to the following specification, appended claims and drawing wherein:

FIG. 1 is a diagrammatic illustration of a power generating system for recharging batteries constructed in accordance with the present invention; and FIG. 2 is a diagrammatic illustration of an electrical circuit for use in the power generating system hereof.

Referring to the drawings, the power generating system hereof includes an intake line designated 10 for fluid, i.e. air or gas, under pressure. The fluid under pressure may be provided from available sources at the location of the generating system, for example if the system is located on a land or offshore oil or gas production platform, natural gas, oil or forced air is readily available. A filter, lubricator, regulator assembly 12, for example of the type manufactured by Perfecting Service, a Division of Reed Tool Co., 332 Atando Avenue, P.O. Box 1949 Charlotte, North Carolina 28201, Part No. 450899 is disposed in the fluid intake line 10 to provide a regulated fluid pressure to a fluid motor 14. The pressure regulator also incorporates a filter for filtering the fluid as well as a lubricator which injects oil to lubricate motor bearings. A pressure acutated switch 16, is also disposed in the fluid intake line 10 between the regulator assembly and the fluid motor 14, the electrical contacts 18 of switch 16 being normally open in the absence of fluid under pressure in intake line 10. A solenoid actuated shutoff valve 20 is also disposed in intake line 10 between the pressure actuated switch 16 and fluid motor 14. This solenoid actuated valve may be of the type manufactured by Skinner Electric Valve Division of Skinner Precision Industries, Inc., New Britain, Connecticut, Model No. XL-2DB 4150. With the foregoing arrangement, it will be appreciated that the fluid under pressure provided through intake line 10 drives the fluid motor 14 with the fluid exhausting through an exhaust line 22.

The drive shaft of the fluid motor 14 is mechanically coupled through a high pressure seal assembly 30 to an alternator 24 designed to be used in hazardous locations. The alternator 24 is, in turn, electrically coupled to a battery designated B which is to be recharged. Alternator 24 may be of the type manufactured by Motorola Automotive Products Division, 9401 West Grand Avenue, Franklin Park, Illinois 60131, Model No. TA12N327.

The electrical circuit for the power generating system hereof will now be described. Opposite sides of the battery terminals are connected via electrical lines 26 and 28 respectively to a load whereby the battery may power electrical systems, for example, emergency lighting systems, communication systems, navaids and other systems requiring limited power. An electrical line 32 connects one side of the battery B to the alternator 24 while electrical line 34 couples the other side of the battery to the alternator.

A sensing unit 36 for sensing the charge on the battery B is provided. Such sensing unit may be of the type manufactured for this charging system by Tano Corp., 4521 West Napoleon Avenue, Metairie, Louisiana 70001, under the trade name of Alternator Control Unit Model No. GS-1. The sensing unit 36 is electrically coupled to the line 34, through contacts 18 of pressure switch 16 in electrical line 38. A pair of electrical lines 40 and 42 electrically connect sensing unit 36 to the alternator 24. Sensing unit 36 also is electrically coupled to the coil 44 of the solenoid actuated valve 20.

In operation, it will be appreciated that fluid under pressure is provided through intake line 10 to drive fluid motor 14. In this condition valve 20 is open and the pressure actuated switch 16 is actuated to close the electrical contacts 18 completing the electrical connection between the battery on the one hand and the sensing unit on the other hand. The fluid motor 14, in turn, drives the alternator 24 and alternator 24 generates electricity to charge the battery B via electrical lines 32 and 34. When the battery B is fully charged by alternator 24, i.e. when the battery obtains a 13–15 volt charge, the sensing unit 36 senses such predetermined battery voltage and electrically opens circuit to coil 44 thereby closing solenoid valve 20 to shut off the supply of fluid under pressure to the fluid motor 14. The sensing unit 36 also opens circuit to the field of alternator 24 to disable the alternator from further charging operations. The motor 14 and alternator 24 thus stop the charging operation. Note that the pressure switch 16 remains actuated and maintains switch 18 closed when the battery is at full charge since fluid under pressure remains available in line 10.

When electrical power is utilized, such load depletes the charge on the battery B. When a lower predetermined voltage on battery B, for example 11 to 12 volts, is sensed by sensing unit 36, the electrical circuit to coil 44, and field of alternator 24 is electrically closed to open the solenoid valve 20 whereby fluid under pressure is again provided fluid motor 14 to drive alternator 24. The electrical circuit to the field of alternator 24 is also closed to energize the field of alternator 24, and hence enables alternator 24 to charge battery B. Alternator 24 thus charges battery B to its predetermined higher voltage whereupon the sensing unit again opens the circuit to coil 44 and field of alternator 24 to stop the charging cycle. Whenever the battery charge is depleted to the lower predetermined voltage, the charging cycle is again initiated.

A particular feature of the present invention resides in the provision of the pressure switch 16 which prevents a power drain from the battery to the sensing unit in the event that the fluid under pressure is shut down or there is inadequate pressure in intake line 10. Particularly, when the pressure in the fluid intake line 10 drops below a predetermined pressure, the pressure switch 16 opens contacts 18 thereby electrically disconnecting the battery B on the one hand from the sensing unit 36 on the other hand. Consequently the charge of the batteries can only be used for the load and the charge is not dissipated through the sensing unit, solenoid valve and alternator.

It will be appreciated that the foregoing described charging system is compact and self-contained and may, for example, be disposed in a single enclosure or housing, not shown. The housing may be suitably constructed for example of fiberglass or steel. Also, from the foregoing, it will be appreciated that the present invention can be formed primarily of conventional elements and/or parts all commercially available.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power generating system comprising a fluid motor, means including a valve for supplying fluid under pressure to said motor, electrical generating means, means connecting said fluid motor and said generating means for driving the latter when fluid is supplied to said fluid motor to generate electricity, a battery, means coupling said battery and said electrical generating means for supplying the generated electricity to said battery to charge the same, means coupled to said battery including a sensor responsive to a battery voltage above a predetermined first voltage for closing said valve to interrupt the supply of fluid to said fluid motor thereby interrupting the generation of electricity and the charging of said battery, said sensor being responsive to a voltage below a predetermined second voltage for opening said valve and providing fluid to said fluid motor thereby to reestablish the generation of electricity and the charging of said battery, and means carried by said fluid supply means and electrically coupled between said battery on the one hand and said generating means and said sensor on the other hand for electrically decoupling said generating means and said sensor from said battery in response to curtailment of fluid from said fluid supply means to preclude power drain-off from said battery to said sensing unit and said electrical generating means.

2. A system according to claim 1 wherein the last mentioned coupling means includes a pressure switch carried by said fluid supply means.

3. A system according to claim 1 wherein said fluid supply means includes a pressure regulator for regulating the fluid under pressure supplied to said fluid motor.

4. A system according to claim 1 wherein said fluid supply means includes a pressure regulator, lubricator and filter for regulating and filtering the fluid under pressure supplied to said fluid motor.

5. A system according to claim 1 wherein the fluid comprises a gas, said fluid motor comprising a gas actuated motor.

6. A power generating system comprising a fluid motor, means for supplying fluid under pressure to said motor, electrical generating means, means connecting said fluid motor and said generating means for driving the latter when fluid is supplied to said fluid motor to generate electricity, a battery, means coupling said battery and said electrical generating means for supplying the generated electricity to said battery to charge the same, means coupled to said battery including a sensor responsive to a battery voltage above a predetermined first voltage to electrically disable said electrical generating means thereby interupting the generation of electricity and the charging of said battery, said sensor being responsive to a voltage below a predetermined second voltage to electrically enable said electrical generating means thereby to reestablish the generation of electricity and the charting of said battery, means carried by said fluid supply means and electrically coupled between said battery on the one hand and said generating means and said sensor on the other hand for electrically decoupling said generating means and said sensor from said battery in response to curtailment of fluid from said fluid supply means to preclude power drain-off from said battery to said sensing unit and said electrical generating means.

7. A system according to claim 6 wherein the last mentioned coupling means includes a pressure switch carried by said fluid supply means.

8. A system according to claim 7 including a valve in said fluid supply means, said sensor being responsive to a battery voltage above said first voltage for closing said valve to interrupt the supply of fluid to said fluid motor and responsive to a voltage below said second voltage for opening said valve and providing fluid to said fluid motor.

* * * * *